United States Patent [19]
Buford

[11] 4,068,833
[45] Jan. 17, 1978

[54] TORCH

[76] Inventor: Wesley E. Buford, 1042 Wingate, Covina, Calif. 91723

[21] Appl. No.: 687,033

[22] Filed: May 17, 1976

Related U.S. Application Data

[63] Continuation of Ser. No. 459,133, April 8, 1974, abandoned.

[51] Int. Cl.$^2$ ............................ B23K 7/00; B23K 7/10
[52] U.S. Cl. .................................. 266/48; 239/587; 266/77
[58] Field of Search .............. 239/587; 266/48, 54–57, 266/67, 68, 71, 77

[56] References Cited

U.S. PATENT DOCUMENTS

| 1,016,613 | 2/1912 | Clifford | 239/587 X |
| 1,205,195 | 11/1916 | Gumz | 239/587 |
| 1,222,319 | 4/1917 | Mueller | 239/587 X |
| 1,288,879 | 12/1918 | Harris | 239/587 X |
| 2,670,789 | 3/1954 | Dieterich | 239/587 X |
| 2,935,125 | 5/1960 | Atkinson | 239/587 X |
| 3,206,180 | 9/1965 | Grubish | 266/57 |

FOREIGN PATENT DOCUMENTS 13,399 of 1911 United Kingdom .............. 239/587

Primary Examiner—Roy Lake
Assistant Examiner—Paul A. Bell
Attorney, Agent, or Firm—William P. Green

[57] ABSTRACT

A torch having a body carrying valves for controlling the flow of fuel and oxygen, with a conduit structure projecting from the body and carrying a two-section swiveling head assembly mounting a nozzle for swinging movement between different angular settings. The two hinge sections are both made relatively short as compared with the length of the conduit structure, in a relation enabling optimum adjustment of the angularity of a produced flame within a wide range of angles, without excessively displacing the actual position of the flame relative to the body of the torch and a work piece. One of the hinge sections is preferably attached rigidly to the conduit structure, and is made small enough in transverse dimension to enable an outer tubular housing part to be received about and moved axially past that hinge section during assembly, to a location about the mentioned conduit structure.

5 Claims, 7 Drawing Figures

U.S. Patent   Jan. 17, 1978   4,068,833
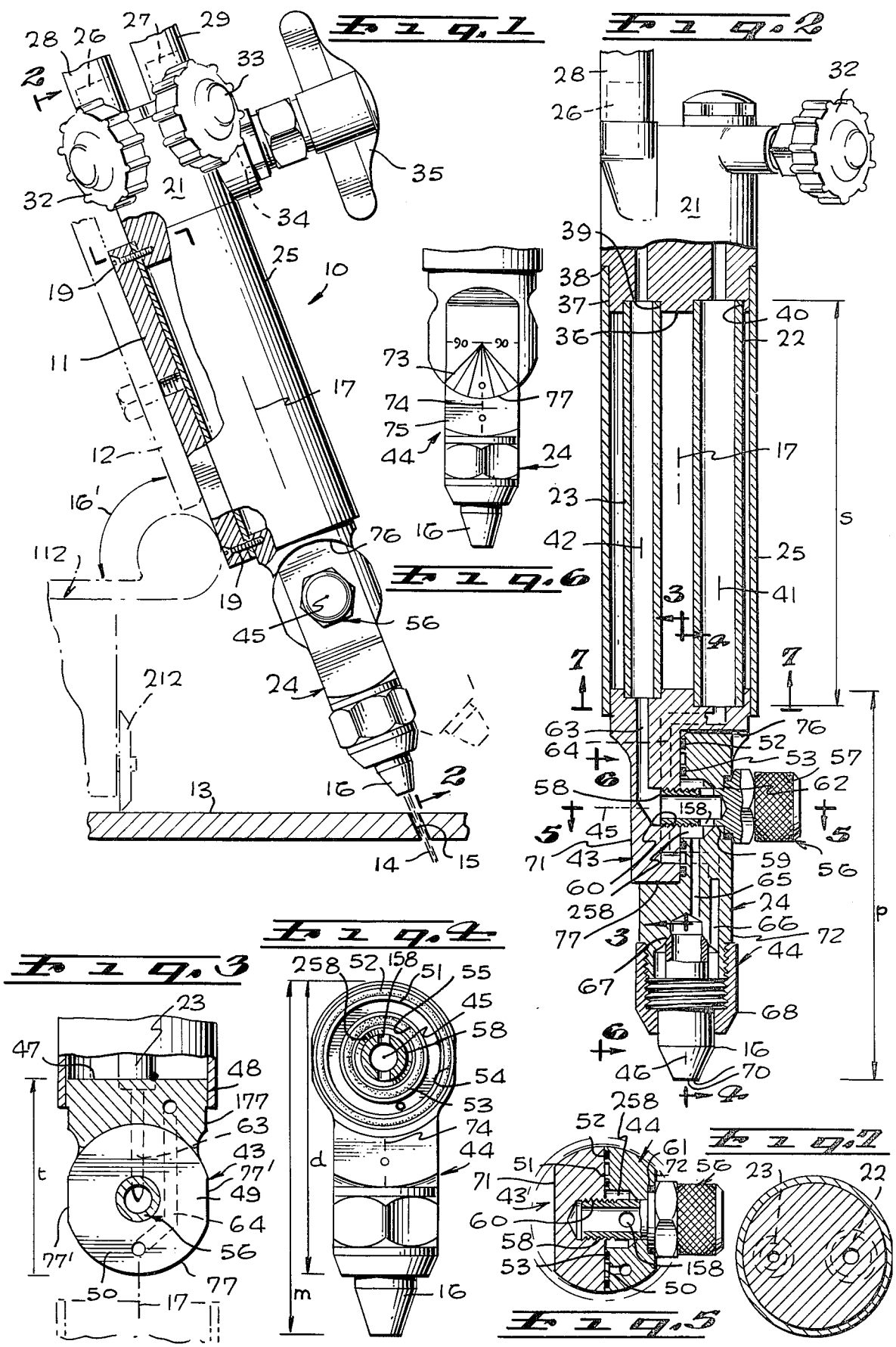

though even more preferably approximately
TORCH

This is a continuation of application Ser. No. 459,133, filed Apr. 8, 1974 and now abandoned.

CROSS-REFERENCE TO RELATED APPLICATION

A torch embodying some of the structural features of the present invention has been illustrated generally but not shown or described in detail in my co-pending application, Ser. No. 417,279, entitled "TORCH TYPE PIPE CUTTER", filed November 19, 1973.

BACKGROUND OF THE INVENTION

This invention relates generally to improved torches, such as oxy-acetylene torches and the like, typically useable for making an angular cut in a pipe.

There have heretofore been devised torches of a type in which a body connectible to sources of fuel and oxygen carries valves for controlling the flow of those fluids, and also carries a pair of conduits projecting from the body to locations at which the conduits carry a head to which at nozzle for producing a flame is connectible. This nozzle normally projects outwardly away from the head in a fixed direction, specifically in a direction longitudinally of the mentioned tubes, so that the flame can only be adjusted in direction by bodily movement of the entire torch structure.

If it is desired to direct the flame at an angle to the longitudinal axis of the torch, it has heretofore been necessary to connect to the mentioned head a separate swivel or hinge attachment, including two relatively adjustable sections, one of which carries the nozzle and is mounted to turn relative to the other section to different angular settings. Such use of a separate hinge attachment, however, results in a relatively long overall assembly, in which the distance from the mentioned head to the tip of the nozzle is so great that any change of the angular setting of the nozzle causes a relatively great displacement of the actual position of the flame itself, in a manner rendering it very difficult if not impossible to so adjust the torch as to produce a flame at any particular desired angle, and at any particular desired position in space.

SUMMARY OF THE INVENTION

The present invention is directed to the provision of an improved torch assembly which is of the above discussed general type, but in which provision is made for adjustment of the angular positioning of a carried nozzle in a much smaller space than has been required with the prior separately formed swivel attachment arrangements. As a result, a torch formed in accordance with the invention is of optimum construction for use in pipe cutting equipment of the type shown in my above discussed prior Application Ser. No. 417,279, and can be utilized to make cuts in a pipe at any of various different angularities, with minimum adjustment of the positioning of the torch body itself, and with the attainment of bevelled cuts in many situations in which prior equipment could not with any adjustment make the cut. Structurally, this is achieved in large part by use of a hinge structure which has one of its sections rigidly attached to an end of the previously mentioned fuel and air delivering conduit structure. The second hinge section is then pivotally attached to this first section. Both sections are desirably made short in axial length, and specifically should have individual lengths which are substantially less than the length of the conduit structure. Desirably, the two sections of the hinge structure are so short that their combined overall length, including both hinge sections and a carried nozzle, is not substantially greater than, and preferably approximately equal to, the length of the conduit structure.

Certain additional features of the invention relate to a unique preferred structural interrelationship between the hinge section which is attached to the conduit structure, and a housing tube which is receivable about the conduit structure. Specifically, in order to increase the facility of assembly of these parts, and at the same time minimize the effective size of the hinge assembly, and in other respects to optimize the structure and functioning of the torch, the housing tube is preferably so dimensioned as to be slidable axially past the non-rotating section of the hinge while disposed thereabout, so that the hinge section will not interfere with movement of the tube to its ultimate assembled position of disposition about the conduit structure.

BRIEF DESCRIPTION OF THE DRAWING

The above and other features of the invention will be better understood from the following detailed description of the typical embodiment illustrated in the accompanying drawing, in which:

FIG. 1 is a side view of a cutting torch constructed in accordance with the invention;

FIG. 2 is an enlarged view taken primarily on line 2—2 of FIG. 1;

FIGS. 3 and 4 are oppositely facing views taken on lines 3—3 and 4—4 respectively of FIG. 2;

FIG. 5 is a transverse section taken on line 5—5 of FIG. 2;

FIG. 6 is a fragmentary side view taken on line 6—6 of FIG. 2; and

FIG. 7 is a transverse section taken on line 7—7 of FIG. 2.

DESCRIPTION OF THE PREFERRED EMBODIMENT

The torch unit 10 of FIG. 1 embodying the invention is typically illustrated as mounted by a saddle part 11 to a support bracket 12 of a pipe cutting carriage 112 which may be of the type disclosed in my above identified co-pending application. This carriage has wheels 212 mounting it and the carried torch 10 to roll circumferentially about a pipe 13, in a relation causing the flame 14 produced by torch 10 to form an annular cut 15 in the pipe. The angle of the cut relative to the axis of the pipe may be adjusted from a right angle condition to any desired bevelled configuration by adjustment of bracket 12 in the direction indicated by arrow 16, and by adjustment of the angularity of flame producing nozzle 16 relative to the main axis 17 of the torch. Saddle part 11 may be connectible to the torch by a pair of screws 19 at its opposite ends, and be connectible to bracket 12 by another screw extending through the bracket and connecting into a threaded opening in the saddle part.

The torch 10 is of a type having an upper body 21, a pair of tubes or conduits 22 and 23 projecting from body 21, a hinged or swiveling flame producing head assembly 24, and a housing tube 25 extending about and enclosing tubes 22 and 23 between body 21 and assembly 24. Body 21 may be a rigid metal part, having two externally threaded tubular gas inlet fittings 26 and 27 to which fuel and oxygen supply lines 28 and 29 may be connected. The body 21 is internally passaged to deliver fuel and oxygen to the two tubes 22 and 23, under the control of manually actuable valves carried by body 21. Preferably, these valves include a first pair of valve units which are contained within body 21 and have a pair of control knobs 32 and 33 at the outside of the body actuable by an operator to pass both fuel and oxygen to the first tube 22; and a second quickly actuable valve 34 in the body controlled by a handle 35 to admit only oxygen to the somewhat smaller second tube 23. As in conventional prior devices of this general type, the valves 22 and 23 may first be opened to admit fuel and a small amount of air to tube 22 and thereby produce an initial flame, and valve 34 may then be opened as desired to supply a greatly increased amount of oxygen to head assembly 24 for increasing the intensity of the flame during an actual cutting operation.

At its underside as viewed in FIG. 2, the rigid torch body 21 may have a downwardly facing surface 36 disposed transversely of the main axis 17 of the torch, with a short external cylindrical surface 37 being formed on body 21 just above the plane of surface 36 and up to the location of a transverse annular shoulder 38. Tubes 22 and 23 are rigid and may be of straight cylindrical internal and external configuration, and be connected into short counterbores 39 and 40 formed in the material of body 21, with the upper ends of the tubes being rigidly brazed or otherwise secured to body 21 in fluid tight sealed relation. The longitudinal axes 41 and 42 of tubes 22 and 23 are parallel to one another and to axis 17 and are offset in opposite directions from axis 17.

The lower head assembly 24, with whose construction certain features of the present invention are particularly concerned, includes a first hinge or swivel section 43 which is rigidly secured to and carried by the lower ends of tubes 22 and 23, and a second and relatively moveable hinge or swivel section 44 mounted to swing relative to section 43 and the connected parts about an axis 45 intersecting and perpendicular to axis 17. Part 44 in turn carries the previously mentioned nozzle 16, by which the fuel and oxygen are emitted along an adjustable flame axis 46 whose direction is determined by the angular setting of section 44 relative to section 43.

The fixed section 43 of the head assembly may have an upper planar surface 47 disposed transversely of axis 17 and containing counterbores into which the lower extremities of tubes 22 and 23 are connected, with tubes 22 and 23 being annularly brazed or otherwise rigidly secured to part 43 in sealed relation to thereby locate part 43 in a rigidly maintained position relative to tubes 22 and 23 and upper body 21 of the torch. Externally, the upper portion of section 43 has a short cylindrical surface 48 centered about axis 17 and of a diameter corresponding to the external diameter of surface 37 of body 21. At a location spaced beneath its upper extremity, section 43 has a downwardly projecting hinge portion 49, having a planar face 50 centered about pivotal axis 45 and facing a surface 51 of part 44. A pair of concentric radially spaced O-rings 52 and 53 are received within outer and inner grooves 54 and 55 in face 51, for annular engagement with surface 50 of part 43, in a relation conducting the gases from tubes 22 and 23 from part 43 to part 44 separately, in any of the various adjusted positions of part 44, and without leakage to the atmosphere. The parts 43 and 44 may be secured together adjustably by a retaining screw 56, having a knurled head 57 received at the outer side of part 44 for manual actuation and having a hollow tubular shank 58 extending through an opening 59 in part 44 and connecting threadedly into a threaded bore 60 in part 43. A seal ring 61 between screw head 57 and a transverse shoulder 62 on part 44 prevents leakage of gas outwardly past the screw, and also resists in frictionally retaining the parts in any desired adjusted position by tightening of screw 56.

As seen best in FIG. 2, pure oxygen is communicated from the lower end of tube 23 to the interior of screw shank 58 through a passage 63 in part 43. This fuel flows through apertures 158 in shank 58 to a space 258 radially inwardly of seal ring 53. The intermixed fuel and oxygen from the lower end of tube 22 is communicated through passages represented at 64 in FIGS. 2 and 3 to the space radially between the two rings 52 and 53.

The pure oxygen from within the interior of inner seal ring 53 is in turn communicated through a passage 65 in part 44 to nozzle 16, while the intermixed fuel and oxygen from between the two rings 52 and 53 is conducted by another passage 66 to the nozzle. The nozzle 16 may have a tapering annular surface 67 engagable with a co-acting tapering surface in part 44, and tightenable against that surface by a nozzle retaining ring 68 threadedly connected onto part 44, with the surface 67 contacting part 44 radially between the lower extremities of passages 65 and 66 to isolate the gases from the two tubes 22 and 23 even as they enter the nozzle, for ultimate admixture as the gases are emitted by a pattern of discharge openings 70 formed in the lower end of the nozzle and centered about axis 46.

The two closely proximate opposed fluid conducting faces 50 and 51 formed on parts 43 and 44 desirably lie in essentially a common plane containing main axis 17 of the torch. At their outer sides, parts 43 and 44 may have planar parallel axially extending side surfaces or flats 71 and 72, disposed parallel to the plane of surface 50, and parallel to axis 17. The side surface 71 of part 43 has angle markings 73 formed thereon (FIG. 6), coacting with an index marking 74 formed on an adjacent flat side face 75 of part 44, which face 75 may lie in approximately the same plane as surface 71. Markings 73 indicate the angularity of nozzle axis 46 with respect to main axis 17 of the torch, giving that angle at several conventional angle settings such as for example, 0°, 15°, 30°, 45°, and 90°. To allow for the desired swinging adjustment of part 44 relative to part 43, these elements may have closely proximate cylindrical surfaces at 76 and 77 (FIGS. 1, 2 and 6) all centered about the pivotal axis 45 of the parts.

The tubular barrel or housing part 25 disposed about and enclosing conduits 22 and 23 may be of straight cylindrical configuration, both internally and externally, and have an inner diameter corresponding essentially to the external diameter of cylindrical surfaces 37 and 48 on parts 21 and 43 respectively. The screws 19 which secure saddle part 11 to the torch may extend through openings in tube 25 and connect into threaded openings formed in the cylindrical portions of parts 21 and 43, to rigidly secure tube 25 in position about conduits 22 and 23.

In order to facilitate assembly of the tool, the part 43 is so shaped and dimensioned as to enable tube 25 to be slipped upwardly past and about part 43 to the illustrated assembled position about conduits 22 and 23 (when part 44 and screw 56 are detached from part 43). For this purpose, part 43 may have, beneath the location of cylindrical surface 48, another cylindrical surface 77, typically of a diameter very slightly smaller than surface 48, and extending entirely about part 43 just above its downwardly projecting portion 49. This cylindrical surface may continue downwardly to have portions formed at 77' on opposite sides of the downwardly projecting portion 49. Stated differently, the cylindrical surface 77—77' may be considered as truncated by the flat surfaces 50 and 71 at opposite sides of the downwardly projecting portion 49 of part 43. Thus, with part 44 and the nozzle detached from part 43, the tube 25 can be easily moved upwardly from the lower broken line position illustrated in FIG. 3 to a position of reception about part 43 (see broken lines in FIG. 5), and with continued upward movement can slip entirely past part 43 to the final assembled full line position of FIGS. 1, 2, 3 and 6.

As indicated previously a particular advantage of the present torch assembly resides in the axially short or compact construction of the flame producing head assembly 24. This result is achieved by forming parts 43 and 44 as well as nozzle 16 to have the shortest possible axial length. More particularly, the axial length $t$ of part 43 and the axial length $d$ of part 44 should both be substantially less than the axial length $s$ of the tubes 22 and 23. The same should be true of nozzle 16, which should be as short axially as possible. Further, the combined length $m$ of part 44 and the carried nozzle should for best results also be substantially less than the axial length $s$ of the conduits. Optimally, the overall combined axial length $p$ of all three of the parts 43, 44 and 16 should be not substantially greater than the length $s$ of the conduits, and desirably approximately equal to that length $s$.

This compact structure of the swivelling head assembly enables the flame to be adjusted to any of its various different positions with minimum displacement of the actual location of the flame relative to axis 17. As a result, the range of effective adjustability of the flame relative to the work piece is maximized, while the necessity for bodily shifting the position of the carriage, or adjusting its angularity relative to the work piece, is minimized, thus rendering the torch extremely versatile for all cutting operations as well as various other uses.

In using the torch, an operator first connects the main upper portion of the torch to carriage element 12 as shown in FIG. 1, and then adjusts the angularity of the nozzle to produce a cut of the desired angularity in pipe 13. During the actual cutting operation, the carriage and torch are advanced progressively about the pipe to form an annular cut therein. The valves at the upper end of the torch are adjusted to produce a proper flame for effecting the desired cut with the maximum facility.

Though a certain embodiment of the present invention has been disclosed as typical, the invention is of course not limited to this particular form, but rather is applicable broadly to all such variations as fall within the scope of the appended claims.

I claim:
1. A torch comprising:
   an outer cylindrical tube centered about a predetermined longitudinal axis;
   a valve body at a first end of said tube having inlets to be connected to sources of fuel and oxygen;
   two tubes smaller in diameter than said outer tube connected to said valve body and projecting therefrom within said outer tube essentially parallel to said axis and toward a second end of said tube;
   manually actuated valves carried by said body for controlling the delivery of fuel and oxygen from said inlets to said smaller tubes respectively;
   a first hinge part at said second end of said tube connected rigidly to said smaller tubes and containing two separate passages for receiving fuel and oxygen from said two smaller tubes respectively;
   a second hinge part detachably connectable to said first hinge part for relative rotary adjusting movement about a hinge axis disposed essentially transversely of and essentially intersecting said longitudinal axis of said outer tube and containing two passages communicating with said two passages respectively in said first hinge part to receive fuel and oxygen respectively therefrom in any relative angular setting of the second hinge part within a predetermined range of movement thereof relative to the first hinge part;
   a nozzle detachably carried by said second hinge part and communicating with said passages therein to receive fuel and oxygen from the passages and constructed to emit both the fuel and oxygen to produce a flame which emits from the nozzle essentially radially of said second axis and is adjustable angularly about said second axis by angular adjustment of said second hinge part;
   said outer tube having an internal diameter slightly greater than the maximum dimension of said first hinge part transversely of said longitudinal axis to pass said first hinge part axially through said outer tube, in a relation enabling said outer tube to be moved to an assembled position about said smaller tubes by bodily advancement of said outer tube axially past said first hinge part while received thereabout;
   said valve body and said first hinge part having short cylindrical external surfaces which project into and are close fits within opposite ends of said outer tube in said assembled position thereof;
   fastener means for retaining said outer tube in said assembled position;
   said first hinge part having at one side thereof a generally flat fluid conducting face at which said two passages of the first hinge part terminate and which extends essentially transversely of said hinge axis, said generally flat face being disposed essentially in a plane which contains said longitudinal axis of said outer tube and which extends essentially diametrically with respect to said longitudinal axis and transversely of said second axis, said face having a maximum width transversely of said longitudinal axis of the outer tube which is just slightly less than the internal diameter of said outer tube;
   said second hinge part having a fluid conducting face opposite and closely proximate to said face of the first hinge part and at which said passages of the second hinge part terminate;
   deformable seal means between said fluid conducting faces disposed essentially in said plane which extends diametrically with respect to said outer tube and positioned to pass fuel and oxygen streams from said first hinge part to said second hinge part in sealed isolation from one another;
   said first hinge part, at a second side thereof, having an external surface curved essentially cylindrically about said longitudinal axis of said outer tube and of a diameter approximately corresponding to the internal size of said outer tube to pass the latter about and past said first hinge part, while said generally flat fluid conducting face extends essentially diametrically across the inside of the outer tube;

said first hinge part having a flat external surface extending along said second side thereof and essentially parallel to said longitudinal axis of said outer tube and to said diametrical plane and to said generally flat face of the first hinge part and truncating said cylindrically curved external surface of said first hinge part and carrying marking means coacting with marking means on said second hinge part to indicate different angular settings of the second hinge part, nozzle and produced flame; and a threaded fastener centered about said hinge axis and extending through a central opening in said second hinge part and axially past said closely proximate faces of the two hinge parts and connected threadedly into said first hinge part in a relation mounting the second hinge part to the first hinge part for rotary movement about said hinge axis;

said two hinge parts and said nozzle having together a combined maximum length in the direction of said longitudinal axis of said outer tube which is not substantially greater than the length in that direction of said two smaller tubes;

said threaded fastener having a shoulder which is clamped against said second hinge part in retaining relation, and having a reduced diameter tubular shank with external threads connected to said first hinge part and containing an internal passage opening at one end into one of said passages in said first hinge part, said tubular shank having at an opposite end thereof a side wall opening near said shoulder for placing said internal passage in communication with one of said passages in the second hinge part.

2. A torch as recited in claim 1, in which said seal means include two concentric radially spaced annular seal rings received within annular concentric grooves in said second hinge part and engaging said generally flat face of said first hinge part with a first of said air and fuel confined radially between said rings and the second confined within the inner of the two rings.

3. A torch as recited in claim 1, in which said fastener means include screws extending through apertures in said outer tube and connecting threadedly into said valve body and first hinge part respectively at the locations of said short cylindrical surfaces thereon.

4. A torch as recited in claim 1, in which said seal means include two concentric radially spaced annular seal rings received within annular concentric grooves in said second hinge part and engaging said generally flat face of said first hinge part with a first of said air and fuel confined radially between said rings and the second confined within the inner of the two rings; said fastener means including screws extending through apertures in said outer tube and connecting threadedly into said valve body and first hinge part respectively at the locations of said short cylindrical surfaces thereon.

5. A torch comprising:
an outer tube centered about a predetermined longitudinal axis;

a valve body at a first end of said tube adapted to be connected to sources of fuel and oxygen;

conduit structure connnected to said valve body and projecting therefrom within said tube toward the second end thereof;

valve means carried by said body for controlling the delivery of fuel and oxygen to said conduit structure;

a first hinge part at said second end of said tube connected to said conduit structure and containing passages for receiving fuel and oxygen from the conduit structure;

a second hinge part detachably connectable to said first hinge part for relative rotary adjusting movement about a hinge axis disposed essentially transversely of said axis of the tube and containing passages communicating in different angular settings of the second hinge part with said passages in the first hinge part to receive fuel and oxygen therefrom;

a nozzle carried by said second hinge part through which said fuel and oxygen are emitted to produce a flame and adjustable to different angular settings relative to said first hinge part with said second hinge part;

said tube having an internal size large enough to pass said first hinge part axially through said tube, in a relation enabling said tube to be moved to a position about said conduit structure by bodily advancement of said tube axially past said first hinge part while received thereabout;

said first hinge part having at one side thereof a generally flat fluid conducting face at which said passages of the first hinge part terminate and which extends essentially transversely of said hinge axis, said face being disposed approximately in a plane which contains said axis of the tube and which extends essentially diametrically with respect to said tube, said face having a width transversely of said axis of the tube which is just slightly less than the internal diameter of said tube;

said second hinge part having a fluid conducting face opposite and closely proximate to said face of the first hinge part and at which said passages of the second hinge part terminate;

seal means between said fluid conducting faces disposed essentially in said plane which extends diametrically with respect to said tube and positioned to pass fuel and oxygen streams from said first hinge part to said second hinge part in sealed isolation from one another; and a threaded fastener having a shoulder which is clamped against said second hinge part in retaining relation, and having a reduced diameter tubular shank with external threads connected to said first hinge part and containing an internal passage opening at one end into one of said passages in said first hinge part, said tubular shank having at an opposite end thereof a side wall opening near said shoulder for placing said internal passage in communication with one of said passages in the second hinge part.

* * * * *